(12) United States Patent
Johnson et al.

(10) Patent No.: US 11,643,515 B2
(45) Date of Patent: *May 9, 2023

(54) POLYIMIDE COMPOSITIONS AND POLYIMIDE SOLUTIONS

(71) Applicant: DUPONT ELECTRONICS, INC., Wilmington, DE (US)

(72) Inventors: Joseph Casey Johnson, Pickerington, OH (US); Kostantinos Kourtakis, Media, PA (US)

(73) Assignee: DUPONT ELECTRONICS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/739,548

(22) Filed: May 9, 2022

(65) Prior Publication Data

US 2022/0259391 A1    Aug. 18, 2022

Related U.S. Application Data

(63) Continuation of application No. 16/794,853, filed on Feb. 19, 2020, now Pat. No. 11,359,061.

(60) Provisional application No. 62/809,090, filed on Feb. 22, 2019.

(51) Int. Cl.
*B32B 7/02* (2019.01)
*C08J 5/18* (2006.01)
*C08G 73/10* (2006.01)

(52) U.S. Cl.
CPC ............ *C08J 5/18* (2013.01); *C08G 73/1082* (2013.01); *C08J 2379/08* (2013.01)

(58) Field of Classification Search
CPC ............ C08G 73/1039; C08G 73/1042; C08G 73/1075; C08G 73/1082; C08J 2379/08; C08J 5/18; C08L 2203/16

See application file for complete search history.

(56) References Cited

U.S. PATENT DOCUMENTS

| | | |
|---|---|---|
| 4,876,329 A | 10/1989 | Chiang et al. |
| 5,166,308 A | 11/1992 | Kreuz et al. |
| 5,298,331 A | 3/1994 | Kanakarajan et al. |
| 11,359,061 B2 * | 6/2022 | Johnson ............. C08G 73/1075 |
| 2012/0016076 A1 | 1/2012 | Kim et al. |
| 2019/0112425 A1 | 4/2019 | Chung |
| 2020/0239635 A1 | 7/2020 | Mcnamara et al. |

FOREIGN PATENT DOCUMENTS

| | | |
|---|---|---|
| WO | 2016/021746 A1 | 2/2016 |
| WO | 2016/032299 A1 | 3/2016 |
| WO | 2016/060340 A1 | 4/2016 |
| WO | 2019/117330 A1 | 6/2019 |

OTHER PUBLICATIONS

Hasegawa; "Development of Solution-Processable, Optically Transparent Polyimides with Ultra-Low Linear Coefficients of Thermal Expansion"; Polymers, 9, 520, 2017.

\* cited by examiner

*Primary Examiner* — Lawrence D Ferguson

(57) ABSTRACT

In a first aspect, a polyimide corn position has a glass transition temperature of less than 300° C. and includes a polyimide derived from a dianhydride, a fluorinated aromatic diamine and an aliphatic diamine. A polyimide film made from the polyimide composition has a b* of less than one for a film thickness of at least 30 microns.

14 Claims, No Drawings

POLYIMIDE COMPOSITIONS AND POLYIMIDE SOLUTIONS

This application is a continuation of application Ser. No. 16/794,853 filed on Feb. 19, 2020.

FIELD OF DISCLOSURE

The field of this disclosure is polyimide compositions and polyimide solutions.

BACKGROUND OF THE DISCLOSURE

Polyimide films can potentially replace rigid glass cover sheets and other substrates which are currently used in display applications, such as organic light-emitting diode (OLED) displays. For example, aromatic polyimides are typically very thermally stable, with glass transition temperatures ($T_g$) of greater than 320° C., and have excellent foldability and rollability, a critical property needed for next-generation flexible displays. For polyimide films used in display applications, in addition to having high transmittance and low haze, the polyimide film also needs to be neutral in color, Typical specifications require that both a* and b* are no greater than 1 color unit from neutral (0) in CIE L*, a*, b* color space coordinates, i.e., the absolute values of a* and b* should be less than 1. The three coordinates of CIE L*, a*, b* represent: (1) the lightness of the color (L*=0 yields black and L*=100 indicates diffuse white), (2) its position between red/magenta and green (negative a* values indicate green, while positive values indicate magenta) and (3) its position between yellow and blue (negative b* values indicate blue and positive values indicate yellow).

Typical polyimides with fluorinated monomers, which are nearly colorless, still absorb light in the blue or violet wavelengths (400-450 nm) which gives the films a yellow appearance in transmission. The color of the polyimide films is mostly generated from charge transfer absorptions arising from HOMO-LUMEN transitions which can occur both within the polymer chains and between polymer chains. Various approaches have been used to alter HOMO-LUMO transition energies or to frustrate interchain interactions. In one approach, a fluorinated monomer is used to alter the HOMO-LUMO transition energies of the polyimide polymer, but still some residual yellow color can be apparent in these polyimide films. Depending on the monomer composition in the polyimide, therefore, b* can be higher than 1. Since the CIE L*, a*, b* color measurement of a film is also dependent on its thickness, achieving a neutral appearance is even more difficult for thicker films, such as those greater than 25 μm.

Polyimides are generally stiff, highly aromatic materials; and the polymer chains tend to orient in the plane of the film as the film is being formed. This leads to differences in the refractive index in the plane of the film and perpendicular to the film. The difference in the parallel and perpendicular refractive indices results in optical retardation that can negatively impact display performance. This difference is measured as the retardation value ($R_{th}$) and is represented by the equation:

$$R_{th} = [(nx' + ny')/2 - nz'] \times d$$

In the equation above, nx', ny' and nz' respectively indicate refractive indices in an X-axis direction, a Y-axis direction and a Z-axis direction in the film. The X axis corresponds to an axial direction exhibiting the refractive index in the surface of the film, the Y axis corresponds to an axial direction perpendicular to the X axis within the surface, and the Z axis corresponds to a thickness direction perpendicular to the X axis and the Y axis. Further, d indicates the thickness of the protective layer in nm.

Touch Sensor Panel (TSP) substrates, positioned behind a circular polarizer in an OLED display, must have ultra-low optical retardation ($R_{th}$) in addition to visible transparency. Unlike polyimide films for OLED cover sheets, where high $T_g$'s are desirable, the polyimide films for TSP substrates often need to be thermoformable (low $T_g$) while still maintaining low color. The thermoformability allows the manufactures to melt process the display components into the desired device form which can wrap around the device contours. Unfortunately, synthetic strategies employed to reduce color in polyimide films also typically raise their $T_g$.

SUMMARY

In a first aspect, a polyimide composition has a glass transition temperature of less than 300° C. and includes a polyimide derived from a dianhydride, a fluorinated aromatic diamine and an aliphatic diamine. A polyimide film made from the polyimide composition has a b* of less than one for a film thickness of at least 30 microns.

The foregoing general description and the following detailed description are exemplary and explanatory only and are not restrictive of the invention, as defined in the appended claims.

DETAILED DESCRIPTION

In a first aspect, a polyimide composition has a glass transition temperature of less than 300° C. and includes a polyimide derived from a dianhydride, a fluorinated aromatic diamine and an aliphatic diamine. A polyimide film made from the polyimide composition has a b* of less than one for a film thickness of at least 30 microns.

In one embodiment of the first aspect, the dianhydride includes 4,4'-(hexafluoroisopropylidene)diphthalic anhydride. In a specific embodiment, the dianhydride further includes an alicyclic dianhydride. In a more specific embodiment, the alicyclic dianhydride is selected from the group consisting of cyclobutane dianhydride, cyclohexane dianhydride, 1,2,3,4-cyclopentanetetracarboxylic dianhydride, hexahydro-4,8-ethano-1H,3H-benzo[1,2-c:4,5-c']difuran-1,3,5,7-tetrone, 3-(carboxymethyl)-1,2, 4-cyclopentanetricarboxylic acid 1,4:2,3-dianhydride and meso-butane-1,2,3,4-tetracarboxylic acid dianhydride.

In another embodiment of the first aspect, the fluorinated aromatic diamine includes 2,2'-bis(trifluoromethyl) benzidine.

In still another embodiment of the first aspect, the aliphatic diamine is selected from the group consisting of 1,2-diaminoethane, 1,6-diaminohexane, 1,4-diaminobutane, 1,7-diaminoheptane, 1,8-diaminooctane, 1,9-diaminononane, 1,10-diaminodecane, 1,11-diaminoundecane, 1,12-diaminododecane, 1,16-hexadecamethylenediamine, 1,3-bis (3-aminopropyl)-tetramethyldisiloxane, isophoronediamine, bicyclo[2.2.2]octane-1,4-diamine and mixtures thereof.

In yet another embodiment of the first aspect, the fluorinated aromatic diamine is present in a range of from 40 to 95 mole percent, based on the total diamine content of the polyimide. In a specific embodiment, the fluorinated aromatic diamine is present in a range of from 50 to 75 mole percent, based on the total diamine content of the polyimide.

In still yet another embodiment of the first aspect, the glass transition temperature is less than 275° C. In a specific embodiment, the glass transition temperature is less than 250° C.

In a further embodiment of the first aspect, the polyimide is a soluble polyimide. In a specific embodiment, the polyimide is soluble in a solvent selected from the group consisting of N-methylpyrrolidone, dimethylacetamide, N,N'-dimethyl-formamide, dimethyl sulfoxide, tetramethyl urea, diethyleneglycol diethyl ether, 1,2-dimethoxyethane, diethylene glycol dimethyl ether, 1,2-bis-(2-methoxyethoxy) ethane, bis [2-(2-methoxyethoxy) ethyl)] ether, gamma-butyrolactone, and bis-(2-methoxyethyl) ether, tetrahydrofuran and mixtures thereof. In another specific embedment, a polyimide solution includes the polyimide composition. In a still more specific embodiment, the polyimide solution further includes a solvent selected from the group consisting of N-methylpyrrolidone, dimethylacetamide, N,N'-dimethyl-formamide, dimethyl sulfoxide, tetramethyl urea, diethyleneglycol diethyl ether, 1,2-dimethoxyethane, diethylene glycol dimethyl ether, 1,2-bis-(2-methoxyethoxy) ethane, bis [2-(2-methoxyethoxy) ethyl)] ether, gamma-butyrolactone, and bis-(2-methoxyethyl) ether, tetrahydrofuran and mixtures thereof.

Many aspects and embodiments have been described above and are merely exemplary and not limiting. After reading this specification, skilled artisans appreciate that other aspects and embodiments are possible without departing from the scope of the invention. Other features and advantages of the invention will be apparent from the following detailed description, and from the claims.

Depending upon context, "diamine" as used herein is intended to mean: (i) the unreacted form (i.e., a diamine monomer); (ii) a partially reacted form (i.e., the portion or portions of an oligomer or other polymer precursor derived from or otherwise attributable to diamine monomer) or (iii) a fully reacted form (the portion or portions of the polymer derived from or otherwise attributable to diamine monomer). The diamine can be functionalized with lo one or more moieties, depending upon the particular embodiment selected in the practice of the present invention.

Indeed, the term "diamine" is not intended to be limiting (or interpreted literally) as to the number of amine moieties in the diamine component. For example, (ii) and (iii) above include polymeric materials that may have two, is one, or zero amine moieties. Alternatively, the diamine may be functionalized with additional amine moieties (in addition to the amine moieties at the ends of the monomer that react with dianhydride to propagate a polymeric chain). Such additional amine moieties could be used to crosslink the polymer or to provide other functionality to the polymer.

Similarly, the term "dianhydride" as used herein is intended to mean the component that reacts with (is complimentary to) the diamine and in combination is capable of reacting to form an intermediate (which can then be cured into a polymer). Depending upon context, "anhydride" as used herein can mean not only an anhydride moiety per se, but also a precursor to an anhydride moiety, such as: (i) a pair of carboxylic acid groups (which can be converted to anhydride by a de-watering or similar-type reaction); or (ii) an acid halide (e.g., chloride) ester functionality (or any other functionality presently known or developed in the future which is) capable of conversion to anhydride functionality.

Depending upon context, "dianhydride" can mean: (i) the unreacted form (i.e. a dianhydride monomer, whether the anhydride functionality is in a true anhydride form or a precursor anhydride form, as discussed in the prior above paragraph); (ii) a partially reacted form (i.e., the portion or portions of an oligomer or other partially reacted or precursor polymer composition reacted from or otherwise attributable to dianhydride monomer) or (iii) a fully reacted form (the portion or portions of the polymer derived from or otherwise attributable to dianhydride monomer).

The dianhydride can be functionalized with one or more moieties, depending upon the particular embodiment selected in the practice of the present invention. Indeed, the term "dianhydride" is not intended to be limiting (or interpreted literally) as to the number of anhydride moieties in the dianhydride component. For example, (i), (ii) and (iii) (in the paragraph above) include organic substances that may have two, one, or zero anhydride moieties, depending upon whether the anhydride is in a precursor state or a reacted state. Alternatively, the dianhydride component may be functionalized with additional anhydride type moieties (in addition to the anhydride moieties that react with diamine to provide a polymer). Such additional anhydride moieties could be used to crosslink the polymer or to provide other functionality to the polymer.

Any one of a number of polyimide manufacturing processes may be used to prepare polyimide films. It would be impossible to discuss or describe all possible manufacturing processes useful in the practice of the present invention. It should be appreciated that the monomer systems of the present invention are capable of providing the above-described advantageous properties in a variety of manufacturing processes. The compositions of the present invention can be manufactured as described herein and can be readily manufactured in any one of many (perhaps countless) ways of those of ordinarily skilled in the art, using any conventional or non-conventional manufacturing technology.

Although methods and materials similar or equivalent to those described herein can be used in the practice or testing of the present invention, suitable methods and materials are described herein.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when lo defining a range.

In describing certain polymers, it should be understood that sometimes applicants are referring to the polymers by the monomers used to make them or the amounts of the monomers used to make them. While such a description may not include the specific nomenclature used to describe the is final polymer or may not contain product-by-process terminology, any such reference to monomers and amounts should be interpreted to mean that the polymer is made from those monomers or that amount of the monomers, and the corresponding polymers and compositions thereof.

The materials, methods, and examples herein are illustrative only and, except as specifically stated, are not intended to be limiting. As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited only those elements but may include other elements not expressly listed or inherent to such method, process, article, or apparatus. Further, unless expressly stated to the contrary, or refers to an inclusive or and not to an exclusive or. For example, a condition A or B is satisfied by any one of the following; A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Organic Solvents

Useful organic solvents for the synthesis of the polymers of the present invention are preferably capable of dissolving the polymer precursor materials. Such a solvent should also have a relatively low boiling point, such as below 225° C., so the polymer can be dried at moderate (i.e., more convenient and less costly) temperatures. A boiling point of less than 210, 205, 200, 195, 190, or 180° C. is preferred.

Solvents of the present invention may be used alone or in combination with other solvents (i.e., cosolvents), Useful organic solvents include: N-methylpyrrolidone (NMP), dimethylacetamide (DMAc), N,N'-dimethyl-formamide (DMF), dimethyl sulfoxide (DMSO), tetramethyl urea (TMU), diethyleneglycol diethyl ether, 1,2-dimethoxyethane (monoglyme), diethylene glycol dimethyl ether (diglyme), 1,2-bis-(2-methoxyethoxy) ethane (triglyme), bis [2-(2-methoxy-ethoxy) ethyl)] ether (tetraglyme), gamma-butyrolactone, and bis-(2-methoxyethyl) ether, tetrahydrofuran. In one embodiment, preferred solvents include N-methylpyrrolidone (NMP) and dimethylacetamide (DMAc).

Co-solvents can generally be used at about 5 to 50 weight percent of the total solvent, and useful such co-solvents include xylene, toluene, benzene, "Cellosolve" (glycol ethyl ether), and "Cellosolve acetate" (hydroxyethyl acetate glycol monoacetate).

Diamines

In one embodiment, a suitable diamine for forming the polyimide film can include an aliphatic diamine, such as 1,2-diaminoethane, 1,6-diaminohexane, 1,4-diaminobutane, 1,7-diaminoheptane, 1,8-diaminooctane, 1,9-diaminon-onane, 1,10-diaminodecane (DMD), 1,11-diaminoundecane, 1,12-diaminododecane (DDD), 1,16-hexadecamethylenediamine, 1,3-bis(3-aminopropyl)-tetramethyldisiloxane, isophoronediamine, bicyclo[2.2.2]octane-1,4-diamine and combinations thereof. Other aliphatic diamines suitable for practicing the invention include those having six to twelve carbon atoms or a combination of longer chain and shorter chain diamines so long as both deveiopability and flexibility are maintained. Long chain aliphatic diamines increase flexibility.

In one embodiment, a suitable diamine for forming the polyimide film can further include a fluorinated aromatic diamine, such as 2,2'-bis(trifluoromethyl) benzidine (TFMB), trifluoromethyl-2,4-diaminobenzene, trifluoromethyl-3,5-diaminobenzene, 2,2'-bis-(4-aminophenyl)-hexafluoro propane, 4,4'-diamino-2,2'-trifluoromethyl diphenyloxide, 3,3'-diamino-5,5'-trifluoromethyl diphenyloxide, 9.9'-bis(4-aminophenyl)fluorene, 4,4'-trifluoromethyl-2,2'-diaminobiphenyl, 4,4'-oxy-bis-[2-trifluoromethyl)benzene amine] (1,2,4-OBABTF), 4,4'-oxy-bis-[3-trifluoromethyl)benzene amine], 4,4'-thio-bis-[(2-trifluoromethyl)benzene amine], 4,4'-thiobis[(3-trifluoromethyl)benzene-amine], 4,4'-sulfoxyl-bis-[(2-trifluoromethyl)benzene amine], 4,4'-sulfoxyl-bis-[(3-trifluoromethyl)benzene amine], 4,4'-keto-bis-[(2-trifluoromethyl)benzene amine], 1,1-bis[4'-(4'-amino-2"-trifluoromethylphenoxy)phenyl]cyclopentane, 1,1-bis[4'-(4"-amino-2"-trifluoromethylphenoxy)phenyl]cyclohexane, 2-trifluoromethyl-4,4'-diaminodiphenyl ether; 1,4-(2'-trifluoromethyl-4',4"-diarninodiphenoxy)-benzene, 1,4-bis(4'-aminophenoxy)-2-[(3',5'-ditrifluoromethyl)phenyl]benzene, 1,4-bis[2'-cyano-3'("4-amino phenoxy)phenoxy]-2-[(3',5'-ditrifluoro-methyl)phenyl]benzene (6FC-diamine), 3,5-di-amino-4-methyl-2',3',5',6'-tetrafluoro-4'-tri-fluoromethyldiphenyloxide, 2,2-Bis[4'(4"-aminophenoxy)phenyl] phthalein-3',5'-bis(trifluoromethyl)anilide (6FADAP) and 3,3',5,5'-tetrafluoro-4,4'-diamino-diphenylmethane (TFDAM). In a specific embodiment, the fluorinated diamine is 2,2'-bis(trifluoromethyl) benzidine (TFMB). In one embodiment, a fluorinated aromatic diamine can be present in a range of from 40 to 95 mole percent, based on the total diamine content of the polyimide. In a more specific embodiment, the fluorinated aromatic diamine can be present in a range of from 50 to 75 mole percent, based on the total diamine content of the polyimide.

In one embodiment, any number of additional diamines can be used in forming the polyimide film, including p-phenylenediamine (PPD), m-phenylenediamine (MPD), 2,5-dimethyl-1,4-diaminobenzene, 2,5-dimethyl-1,4-phenylenediamine (DPX), 2,2-bis-(4-aminophenyl) propane, 1,4-naphthalenediamine, 1,5-naphthalenediamine, 4,4'-diaminobiphenyl, 4,4"-diamino terphenyl, 4,4'-diamino benzanilide, 4,4'-diaminophenyl benzoate, 4,4-diaminobenzophenone, 4,4'-diaminodiphenylmethane (MDA), 4,4'-diaminodiphenyl sulfide, 4,4'-diaminodiphenyl sulfone, 3,3'-diaminodiphenyl sulfone, bis-(4-(4-aminophenoxy)phenyl sulfone (BAPS), 4,4'-bis-(aminophenoxy)biphenyl (BAPB), 4,4'-diaminodiphenyl ether (ODA), 3,4'-diaminodiphenyl ether, 4,4'-diaminobenzophenone, 4,4'-isopropylidenediani-line, 2,2'-bis-(3-aminophenyl)propane, N,N-bis-(4-aminophenyl)-n-butylamine, N,N-bis-(4-aminophenyl) methylamine, 1,5-diaminonaphthalene, 3,3'-dimethyl-4,4'-diaminobiphenyl, m-amino benzoyl-p-amino anilide, 4-aminophenyl-3-aminobenzoate, N,N-bis-(4-aminophenyl) aniline, 2,4-diaminotoluene, 2,5-diaminotoluene, 2,6-diaminotoluene, 2,4-diamine-5-chlorotoluene, 2,4-diamine-6-chlorotoluene, 2,4-bis-(beta-amino-t-butyl) toluene, bis-(p-beta-amino-t-butyl phenyl) ether, p-bis-2-(2-methyl-4-aminopentyl) benzene, m-xylylene diamine, and p-xylylene diamine.

Other useful diamines include 1,2-bis-(4-aminophenoxy) benzene, 1,3-bis-(4-aminophenoxy) benzene, 1,2-bis-(3-aminophenoxy)benzene, 1,3-bis-(3-aminophenoxy) benzene, 1-(4-aminophenoxy)-3-(3-aminophenoxy) benzene, 1,4-bis-(4-aminophenoxy) benzene, 1,4-bis-(3-aminophenoxy) benzene, 1-(4-aminophenoxy)-4-(3-aminophenoxy) benzene, 2,2-bis-(4-[4-aminophenoxy]phenyl) propane (BAPP), 2,2'-bis-(4-phenoxy aniline) isopropylidene, 2,4,6-trimethyl-1,3-diaminobenzene and 2,4,6-trimethyl-1,3-di-aminobenzene.

Dianhydrides

In one embodiment, any number of suitable dianhydrides can be used in forming the polyimide film, The dianhydrides can be used in their tetra-acid form (or as mono, di, tri, or tetra esters of the tetra acid), or as their diester acid halides (chlorides), However, in some embodiments, the dianhydride form can be preferred, because it is generally more reactive than the acid or the ester.

Examples of suitable dianhydrides include 3,3',4,4'-biphenyl tetracarboxylic dianhydride (BPDA), 1,2,5,6-naphthalene tetracarboxylic dianhydride, 1,4,5,8-naphthalene tetracarboxylic dianhydride, 2,3,6,7-naphthalene tetracarboxylic dianhydride, 2-(3',4'-dicarboxyphenyl) 5,6-dicarboxybenzimidazole dianhydride, 2-(3',4'-dicarboxyphenyl) 5,6-dicarboxybenzoxazole dianhydride, 2-(3',4'-dicarboxyphenyl) 5,6-dicarboxybenzothiazole dianhydride, 2,2',3,3-benzophenone tetracarboxylic is dianhydride, 2,3,3',4'-benzophenone tetracarboxylic dianhydride, benzophenone tetracarboxylic dianhydride (BTDA), 2,2',3,3'-biphenyl tetracarboxylic dianhydride, 2,3,3',4'-biphenyl tetracarboxylic dianhydride, bicyclo-[2,2,2]-octen-(7)-2,3,5,6-tetracarboxylic-2,3,5,6-dianhydride, 4,4'-thio-diphthalic anhydride, bis (3,4-dicarboxyphenyl) sulfone dianhydride, bis (3,4-dicarboxyphenyl) sulfoxide dianhydride (DSDA), bis (3,4-dicarboxyphenyl oxadiazoie-1,3,4) p-phenylene dianhydride, bis (3,4-dicarboxyphenyl) 2,5-oxadiazole 1,3,4-dianhydride, bis 2,5-(3', 4'-dicarboxydiphenylether) 1,3,4-oxadiazole dianhydride, 4,4'-oxydiphthalic anhydride (ODPA), bis (3,4-dicarboxyphenyl) thio ether dianhydride, bisphenol A dianhydride (BPADA), bisphenol S dianhydride, bis-1,3-isobenzofurandione, 1,4-bis(4,4-oxyphthalic anhydride) benzene, bis (3,4-dicarboxyphenyl) methane dianhydride, cyclopentadienyl tetracarboxylic acid dianhydride, cyclopentane tetracarboxylic dianhydride, ethylene tetracarboxylic acid dianhydride, perylene 3,4,9,10-tetracarboxylic dianhydride, pyromellitic dianhydride (PMDA), tetrahydrofuran tetracarboxylic dianhydride, 1,3-bis-(4,4'-oxydiphthalic anhydride) benzene, 2,2-bis(3,4-dicarboxyphenyl) propane dianhydride, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-1,4,5,8-tetracarboxylic dianhydride, phenanthrene-1,8,9,10-tetracarboxylic dianhydride, pyrazine-2,3,5,6-tetracarboxylic dianhydride, benzene-1,2,3,4-tetracarboxylic dianhydride and thiophene-2,3, 4,5-tetracarboxylic dianhydride.

In one embodiment, a suitable dianhydride can include an alicyclic dianhydride, such as cyclobutane diandydride (CBDA), cyclohexane dianhydride, 1,2,3,4-cyclopentanetetracarboxylic dianhydride (LPDA), hexahydro-4,8-ethano-1H,3H-benzo[1,2-c']difuran-1,3,5,7-tetrone (BOLA), 3-(carboxymethyl)-1,2,4-cyclopentanetricarboxylic acid 1,4:2,3-dianhydride (TCA) and meso-butane-1,2, 3,4-tetracarboxylic acid dianhydride.

In one embodiment, a suitable dianhydride for forming the polyimide film can include a fluorinated dianhydride, such as 4,4'-(hexafluoroisopropylidene)diphthalic anhydride (6FDA) and 9,9-bis (trifluoromethyl)-2,3,6,7-xanthene tetracarboxylic dianhydride. In a specific embodiment, the fluorinated dianhydride is 4,4'-(hexafluoroisopropylidene)diphthalic anhydride (6FDA).

Polyimide Films

In one embodiment, a polyimide film can be produced by combining a diamine and a dianhydride (monomer or other polyimide precursor form) together with a solvent to form a polyamic acid (also called a polyimide acid) solution. The dianhydride and diamine can be combined in a molar ratio of about 0.90 to 1.10. The molecular weight of the polyamic acid formed therefrom can be adjusted by adjusting the molar ratio of the dianhydride and diamine.

In one embodiment, a polyamic acid casting solution is derived from the polyamic acid solution. The polyamic acid casting solution preferably comprises the polyamic acid solution can optionally be combined with conversion chemicals like: (i) one or more dehydrating agents, such as, aliphatic acid anhydrides (acetic anhydride, etc.) and/or aromatic acid anhydrides; and (ii) one or more catalysts, such as, aliphatic tertiary amines (triethyl amine, etc.), aromatic tertiary amines (dimethyl aniline, etc.) and heterocyclic tertiary amines (pyridine, picoline, isoquinoline, etc.). The anhydride dehydrating material it is often used in molar excess compared to the amount of amide acid groups in the polyamic acid. The amount of acetic anhydride used is typically about 2.0-4.0 moles per equivalent (repeat unit) of polyamic acid. Generally, a comparable amount of tertiary amine catalyst is used. Nanoparticles, dispersed or suspended in solvent as described above, are then added to the polyamic acid solution.

In one embodiment, the polyamic acid solution, and/or the polyamic acid casting solution, is dissolved in an organic solvent at a concentration from about 5.0 or 10% to about 15, 20, 25, 30, 35 and 40% by weight.

The polyamic acid (and casting solution) can further comprise any one of a number of additives, such as processing aids (e.g., oligomers), antioxidants, light stabilizers, flame retardant additives, anti-static agents, heat stabilizers, ultraviolet absorbing agents, inorganic fillers or various reinforcing agents. Inorganic fillers can include thermally conductive fillers, metal oxides, inorganic nitrides and metal carbides, and electrically conductive fillers like metals, graphitic carbon and carbon fibers. Common inorganic fillers are alumina, silica, silicon carbide, diamond, clay, boron nitride, aluminum nitride, titanium dioxide, dicalcium phosphate, and fumed metal oxides. Common organic fillers include polyaniline, polythiophene, polypyrrole, polyphenylenevinylene, polydialkylfluorenes, carbon black, graphite, multiwalled and single walled carbon nanotubes and carbon nanofibers.

The solvated mixture (the polyamic acid casting solution) can then be cast or applied onto a support, such as an endless belt or rotating drum, to give a film. In one embodiment, the polyamic acid can be solution cast in the presence of an imidization catalyst. Use of an imidization catalyst can help to lower the imidization temperature and shorten the imidization time, and can also help in the formation of refractive index-matching nanoparticle aggregates that essentially maintain the volume ratio of low and high index nanoparticles in the aggregate. Typical imidization catalysts can range from bases such as imidazole, 1-methylimidazole, 2-methylimidazole, 1,2-dimethylimidazole, 2-phenylimidazole, benzimidazole, isoquinoline, or substituted pyridines such as methyl pyridines, lutidine, and trialkylamines. Combinations of the tertiary amines with acid anhydrides can be used. These dehydration agents, which can act as co-catalysts, include acetic anhydride, propionic anhydride, n-butyric anhydride, benzoic anhydride and others. The ratio of these catalysts and their concentration in the polyamic acid layer will influence imidization kinetics and the film properties. Next, the solvent containing-film can be converted into a self-supporting film by heating at an appropriate temperature (thermal curing) together with conversion chemical reactants (chemical curing). The film can then be separated from the support, oriented such as by tentering, with continued thermal and chemical curing to is provide a polyimide film.

Useful methods for producing polyimide films containing a polyimide in accordance with the present invention can be found in U.S. Pat. Nos. 5,166,308 and 5,298,331, which are incorporate by reference into this specification for all teachings therein. Numerous variations are also possible, such as, (a) A method wherein the diamine components and dianhydride components are preliminarily mixed together and then the mixture is added in portions to a solvent while stirring.

(b) A method wherein a solvent is added to a stirring mixture of diamine and dianhydride components. (contrary to (a) above)

(c) A method wherein diamines are exclusively dissolved in a solvent and then dianhydrides are added thereto at such a ratio as allowing to control the reaction rate.

(d) A method wherein the dianhydride components are exclusively dissolved in a solvent and then amine components are added thereto at such a ratio to allow control of the reaction rate.

(e) A method wherein the diamine components and the dianhydride components are separately dissolved in solvents and then these solutions are mixed in a reactor.

(f) A method wherein the polyamic acid with excessive amine component and another polyamic acid with excessive dianhydride component are preliminarily formed and then reacted with each other in a reactor, particularly in such a way as to create a non-random or block copolymer.

(g) A method wherein a specific portion of the amine components and the dianhydride components are first reacted and then the residual diamine components are reacted, or vice versa.

(h) A method wherein the conversion chemicals (catalysts) are mixed with the polyamic acid to form a polyamic acid casting solution and then cast to form a gel film.

(i) A method wherein the components are added in part or in whole in any order to either part or whole of the solvent, also where part or all of any component can be added as a solution in part or all of the solvent.

(j) A method of first reacting one of the dianhydride components with one of the diamine components giving a first polyamic acid. Then reacting another dianhydride component with another amine component to give a second polyamic acid. Then combining the amic acids in any one of a number of ways prior to film formation.

In one embodiment, if the polyimide is soluble in a non-protic solvent, such as DMAc or NMP, the polyimide can be formed in solution, optionally with the addition of catalysts at higher temperatures (>25° C.). After filtration, the polyimide powder can be re-dissolved in a solvent. The polyimide solution can then be cast onto a support (e.g. a moving belt or rigid support) and coalesced to create a polyimide film.

The thickness of the polymer film may be adjusted, depending on the intended purpose of the film or final application specifications. In one embodiment, the polyimide film has a total thickness in a range of from about 10 to about 80 μm, or from about 10 to about 25 μm, or from about 15 to about 25 μm.

Applications

In one embodiment, a polyimide film can be used for a number of layers in electronic device applications, such as in an organic electronic device. Nonlimiting examples of such layers include device substrates, touch panels, substrates for color filter sheets, cover films, and others. The particular materials' properties requirements for each application are unique and may be addressed by appropriate composition(s) and processing condition(s) for the polyimide films disclosed herein. Organic electronic devices that may benefit from having a coated film include, but are not limited to, (1) devices that convert electrical energy into radiation (e.g., a light-emitting diode, light emitting diode display, lighting device, luminaire, or diode is laser), (2) devices that detect signals through electronics processes (e.g., photodetectors, photoconductive cells, photoresistors, photoswitches, phototransistors, phototubes, IR detectors, biosensors), (3) devices that convert radiation into electrical energy, (e.g., a photovoltaic device or solar cell), (4) devices that convert light of one wavelength to light of a longer wavelength, (e.g., a down-converting phosphor device); and (5) devices that include one or more electronic components that include one or more organic semi-conductor layers (e.g., a transistor or diode).

In one embodiment, a polyimide film can be used as a touch sensor panel (TSP) substrate. TSP substrates, positioned behind a circular polarizer in an OLED display, must have ultra-low optical retardation ($R_{th}$) in addition to visible transparency. In one embodiment, a polyimide film can have a b* of less than one for a film thickness of at least 30 microns and a glass transition temperature of less than 300° C. In a specific embodiment, the polyimide film has a $T_g$ of less than 275° C., or less than 250° C. In one embodiment, a polyimide film can have an Rth of less than 60 nm, or less than 50 nm, or less than 40 nm. In one embodiment, a polyimide film can have a transmittance of at least 90%, when measured using ASTM D1003 over the wavelength range of 400-700 nm. In one embodiment, a polyimide film can have a haze of less than 1%. In some instances, TSP substrates need to be thermoformable (low $T_g$) while maintaining low color. The thermoformability allows the manufactures to melt process the display components into the desired device form which can wrap around the device contours.

The advantageous properties of this invention can be observed by reference to the following examples that illustrate, but do not limit, the invention. All parts and percentages are by weight unless otherwise indicated.

EXAMPLES

Test Methods

Measurement of CIE L*, a*, b* Color

Color measurements were performed using a ColorQuest® XE dual-beam spectrophotometer (Hunter Associates Laboratory, Inc., Reston, VA.), using D65 illumination and 10 degree observer, in total transmission mode over a wavelength range of 380 to 780 nm.

Transmittance and Haze

Transmittance and haze were measured using a HazeGuard Plus (BYK-Gardner GmbH, Germany), with the haze measured in transmission by collecting forward scattered light using the method described by ASTM1003. Percent haze was determined by measuring the amount of light which deviates from the incident beam by more than 2.5 degrees on average.

Glass Transition Temperature

Glass transition temperature ($T_g$) was measured using a DMA Q800 (TA Instruments, New Castle, Del.) operating at a frequency of 1 Hz over a temperature range of from room temperature to 350° C.

Through-Plane Retardation

Through plane retardation ($R_{th}$) was measured at 550 nm using an AxoScan™ Mapping SpectroPolarimeter (Axometrics Inc., Huntsville, Ala.).

Thickness

Coating thickness was determined by measuring coated and uncoated samples in 5 positions across the profile of the film using a contact-type FISCHERSCOPE MMS PC2

EXAMPLE 1

For the polyamic acid solution (PAA) of Example 1 (E1) with a monomer composition of 6FDA 1.0//TFMB 0.5/ HMD 0.5 (molar equivalents), into a 500-ml reaction vessel, equipped with mechanical stirring and nitrogen purged atmosphere, 298.2 g anhydrous DMAc and 50.0 g of 4,4'-(hexafluoroisopropylidene)diphthalic anhydride (6FDA, Synasia Inc., Metuchen, N.J.) was added. 18.02 g of trifluoromethylbenzidine (TFMB, Seika Corp., Wakayam Seika Kogyo Co., LTD., Japan) and 6.54 g of 1,6-diaminohexane (HMD, TCI America, Portland, Oreg.) were added slowly over a period of 20 minutes. The reaction mixture was stirred and heated at 40° C. for 16 hours. The solution became slightly viscous. Films were prepared by doctor blade coating the polyamic-acid solution onto glass treated with a release agent. The polyamic-acid films were dried at 80° C. to form a film of approximately 70 to 80 wt % solids. The film was then cured in an oven from 150° C. to 300° C. over the course of 20 minutes. The dry thickness of the film was 34.0 μm.

EXAMPLE 2

For Example 2 (E2), the same procedure as described in E1 was used, but the monomer composition was 6FDA 1.0//TFMB 0.75/HMD 0.25. The dry thickness of the film was 36.8 μm.

Both E1 and E2 had an excellent combination of low color and $T_g$, good transmittance and haze, and low optical retardation.

COMPARATIVE EXAMPLE 1

For Comparative Example 1 (CE1), the same procedure as describe in E1 was used, but the monomer composition was 6FDA 1.0//TFMB 1.0. The dry thickness of the film was 32.1 μm. With a fluorinated aromatic diamine, but no aliphatic diamine, CE1 has good optical properties, but with a higher $T_g$.

COMPARATIVE EXAMPLE 2

For Comparative Example 2 (CE2), the same procedure as describe in E1 was used, but the monomer composition was 6FDA 1.0//3,5-diaminobenzotrifluoride, a meta-diamine with a trifluoromethyl group (Oakwood Chemical, Estill, S.C.). The dry thickness of the film was 34.4 μm, Despite the presence of the meta-linkage and the electron withdrawing trifluoromethyl group, the b* of CE2 was significantly higher at 2.47.

COMPARATIVE EXAMPLE 3

For Comparative Example 3 (CE3), the same procedure as describe in E1 was used, but the monomer composition was 6FDA 1.0//TFMB 0.5/1,4-butanediamine 0.5 (Sigma-Aldrich, St. Louis, Mo.). The dry thickness of the film was 38.6 μm. The film was very brittle and had a high b* of 2.02.

COMPARATIVE EXAMPLE 4

For Comparative Example 4 (CE4), the same procedure as describe in E1 was used, but the monomer composition was 6FDA 1.0//TFMB 0.5/2,2-bis[4-(4-aminophenoxy)phenyl]hexafluoropropane 0.5 (BDAF, Fluorotech USA, Rancho Cucamonga, Calif.). The dry thickness of the film was 38.1 μm. Despite the inclusion of a flexible fluorinated aromatic diamine, the b* of CE4 was quite high at 3.67.

As shown in Table 1, E1 and E2 provide good optical properties, with low color (b*) and low optical retardation ($R_{th}$), while also having significantly lower glass transition temperatures. Their low $T_g$'s enable them to be thermoformable, and thus they can be used as electronic device layers where thermoformability is needed, such as in a touch sensor panel.

TABLE 1

| Example | Thickness (μm) | b* | $T_g$ (° C.) | Transmittance (%) | Haze (%) | $R_{th}$ (nm) |
|---|---|---|---|---|---|---|
| E1 | 34.0 | 0.70 | 181 | 90 | 0.18 | 34.0 |
| E2 | 36.8 | 0.89 | 240 | 90 | 0.19 | 27.6 |
| CE1 | 32.1 | 1.16 | 325 | 90 | 0.32 | 28.8 |
| CE2 | 34.4 | 2.47 | 300 | 89 | — | 16.3 |
| CE3 | 38.6 | 2.02 | — | — | — | — |
| CE4 | 38.1 | 3.67 | 294 | 87 | — | — |

Note that not all of the activities described above in the general description are required, that a portion of a specific activity may not be required, and that further activities may be performed in addition to those described. Still further, the order in which each of the activities are listed are not necessarily the order in which they are performed. After reading this specification, skilled artisans will be capable of determining what activities can be used for their specific needs or desires.

In the foregoing specification, the invention has been described with reference to specific embodiments. However, one of ordinary skill in the art appreciates that various modifications and changes can be made without departing from the scope of the invention as set forth in the claims below. All features disclosed in this specification may be replaced by alternative features serving the same, equivalent or similar purpose. Accordingly, the specification and figures are to be regarded in an illustrative rather than a restrictive sense and all such modifications are intended to be included within the scope of the invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A polyimide composition having a glass transition temperature of less than 300° C. and comprising a polyimide derived from:
    a dianhydride;
    a fluorinated aromatic diamine; and
    an aliphatic diamine, wherein a polyimide film made from the polyimide composition has a b* of less than one for a film thickness of at least 30 microns.

2. The polyimide composition of claim 1, wherein the dianhydride comprises 4,4"-(hexafluoroisopropylidene) diphthalic anhydride.

3. The polyimide composition of claim 2, wherein the dianhydride further comprises an alicyclic dianhydride.

4. The polyimide composition of claim 3, wherein the alicyclic dianhydride is is selected from the group consisting of cyclobutane dianhydride, cyclohexane dianhydride, 1,2,3,4-cyclopentanetetracarboxylic, dianhydride, hexahydro-4,8-ethano-1H,3H-benzo[1,2-c:4,5-c']difuran-1,3,57-tetrone, 3-(carboxymethyl)-1,2,4-cyclopentanetricarboxylic acid 1,4:2,3-dianhydnde and mesd-butane-1,2,3,4-tetracarboxylic acid dianhydride.

5. The polyimide composition of claim 1, wherein the fluorinated aromatic diamine comprises 2,2'-bis(trifluoromethyl) benzidine.

6. The polyimide composition of claim 1, wherein the aliphatic diamine is selected from the group consisting of 1,2-diaminoethane, 1,6-diaminohexane, 1,4-diaminobutane, 1,7-diaminoheptane, 1,8-diaminooctane, 1,9-diaminononane, 1,10-diaminodecane, 1,11-diaminoundecane, 1,12-diaminododecane, 1,16-hexadecamethylenediamine, 1,3-bis(3-aminopropyl)-tetramethyldisiloxane, isophoronediamine, bicyclo[2.2.2]octane-1,4-diamine and mixtures thereof.

7. The polyimide composition of claim 1, wherein the fluorinated aromatic diamine is present in a range of from 40 to 95 mole percent, based on the total diamine content of the polyimide.

8. The polyimide composition of claim , wherein the fluorinated aromatic diamine is present in a range of from 50 to 75 mole percent, based on the total diamine content of the polyimide.

9. The polyimide composition of claim 1, wherein the glass transition temperature is less than 275° C.

10. The polyimide composition of claim 9, wherein the glass transition temperature is less than 250° C.

11. The polyimide composition of claim 1, wherein the polyimide is a soluble polyimide.

12. The polyimide composition of claim 11, wherein the polyimide is soluble in a solvent selected from the group consisting of N-methylpyrrolidone, dimethylacetamide, N,N'-dimethyl-formamide, dimethyl sulfoxide, tetramethyl urea, diethyleneglycol diethyl ether, 1,2-dimethoxyethane, diethylene glycol dimethyl ether, 1,2-bis-(2-methoxyethoxy) ethane, bis [2-(2-methoxyethoxy)ethyl)] ether, gamma-butyrolactone, and bis-(2-methoxyethyl) ether, tetrahydrofuran and mixtures thereof.

13. A polyimide solution comprising the polyimide composition of claim 11.

14. The polyimide solution of claim 13, further comprising a solvent selected from the group consisting of N-methylpyrrolidone, dimethylacetamide, N,N'-dimethyl-formamide, dimethyl sulfoxide, tetramethyl urea, diethyleneglycol diethyl ether, 1,2-dimethoxyethane, diethylene glycol dimethyl ether, 1,2-bis-(2-methoxyethoxy) ethane, bis [2-(2-methoxyethoxy) ethyl)] ether, gamma-butyrolactone, and bis-(2-methoxyethyl) ether, tetrahydrofuran and mixtures thereof.

* * * * *